Dec. 9, 1952 W. SEDAR 2,621,075
MULTIPLE IRRIGATION TUBING
Filed May 21, 1951
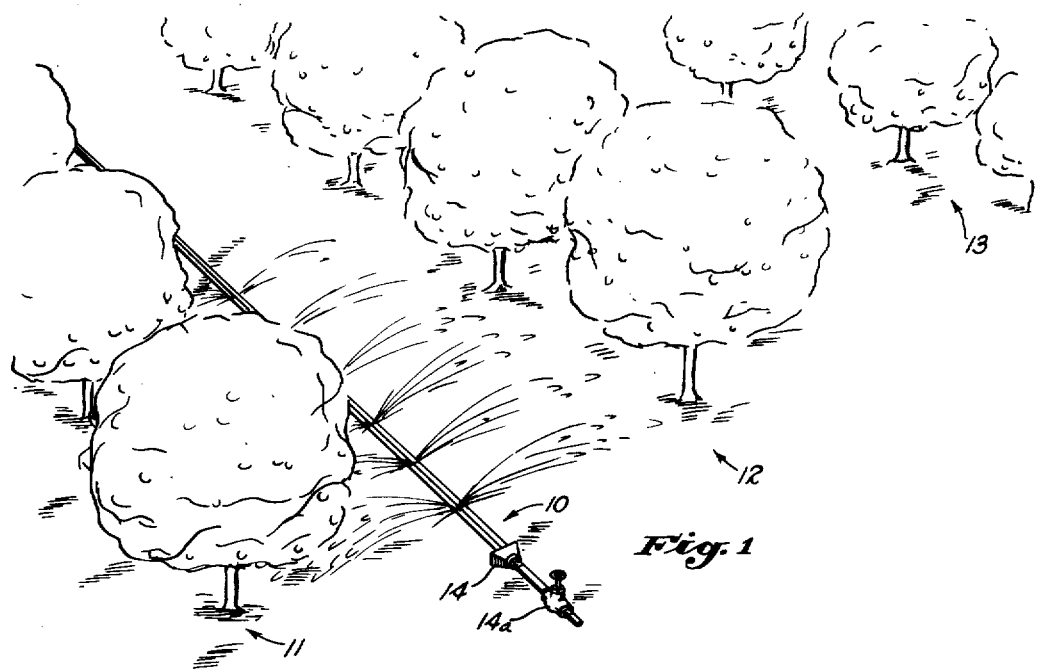
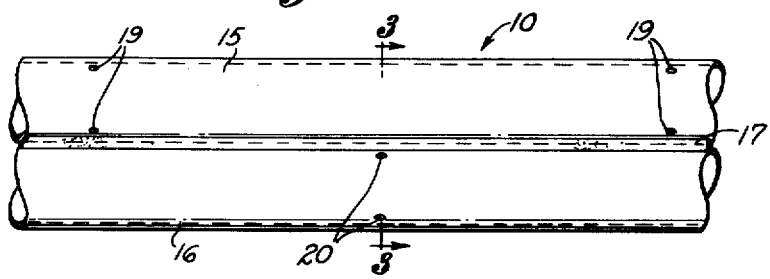
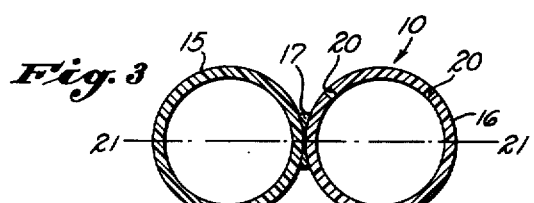
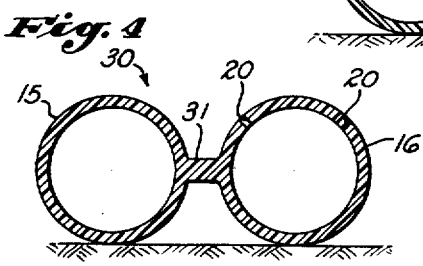
INVENTOR:
WILLIAM SEDAR
BY HIS ATTORNEYS
HARRIS, KIECH, FOSTER & HARRIS Patented Dec. 9, 1952

2,621,075

UNITED STATES PATENT OFFICE 2,621,075

MULTIPLE IRRIGATION TUBING

William Sedar, Santa Barbara, Calif., assignor to Resin Industries, Santa Barbara, Calif., a corportion of California Application May 21, 1951, Serial No. 227,341

7 Claims. (Cl. 299—104)

1

The present invention relates in general to irrigation tubings and a primary object of the invention is to provide a tubing which will distribute irrigation water evenly over relatively large areas.

In irrigating orchards or groves, such as citrus or avocado groves, a sprinkling or spraying action is desirable to obtain uniform distribution of the irrigation water and to avoid the necessity for ditching the grove, which damages the feeder roots found close to the surface. The present invention is applicable to irrigating such orchards or groves and will be considered in connection therewith as a matter of convenience, although it will be understood that it may be employed for irrigating many other plantings, such as permanent pastures, gardens, and the like.

Conventionally, the trees in orchards are laid out in rows, and where portable sprinkling systems are used, such systems are disposed between two rows of trees and are moved from row to row as the irrigation of the orchard progresses. In order to preserve the desired spraying or sprinkling pattern as the sprinkling systems are moved from row to row in this manner, it is necessary to provide means for maintaining the desired orientations of the holes or orifices through which the water is discharged.

A primary object of the present invention is to provide an irrigation tubing formed of flexible material, such as rubber or flexible synthetic resins or plastics, so that it may readily be moved from one row of trees to another.

An important object of the invention is to provide such a flexible irrigation tubing which automatically orients the spraying or sprinkling orifices or holes properly when the tubing is placed in position.

More particularly, an important object of the invention is to provide an irrigation tubing which includes two or more tubes of flexible material disposed side by side and secured together so that the irrigation tubing will lie flat in the desired position when placed on the ground.

Another object is to provide each tube of the double-tube irrigation tubing with pairs of orifices disposed above the plane defined by the axes of the two tubes, the pairs of orifices being spaced apart axially of the tubes and the pairs of orifices in one of the tubes being staggered with respect to the pairs of orifices of the other to secure more uniform distribution.

Another object is to provide an irrigation tubing wherein the orifices of each pair are inclined upwardly and outwardly in opposite direc-

2 tions so that the water discharged through one orifice of each pair is projected toward one side of the tubing and the water discharged through the other orifice of the same pair is projected toward the opposite side of the tubing. With the orifices of each pair so related, and with the pairs of orifices in the respective tubes staggered with respect to each other, very uniform distribution of irrigation water is attained, which is an important feature of the invention.

The foregoing objects and advantages of the present invention, together with various other objects and advantages which will become apparent, may be attained with the exemplary embodiments of the invention illustrated in the accompanying drawing and described in detail hereinafter. Referring to the drawing:

Fig. 1 is a perspective view of an orchard or grove showing the invention in use therein;

Fig. 2 is an enlarged plan view of a section of the irrigation tubing of the invention;

Fig. 3 is a transverse sectional view taken along the arrowed line 3—3 of Fig. 2; and Fig. 4 is a view similar to Fig. 3 but illustrating an alternative embodiment of the invention.

Referring particularly to Fig. 1 of the drawing, the numeral 10 generally designates the irrigation tubing of the invention in use between the two rows 11 and 12 of trees in an orchard or grove, a third row of trees 13 being shown also. The irrigation tubing 10 is shown as connected to a header 14 and as controlled by a valve 14a. Water is supplied to the irrigation tubing 10 in sufficient volume and at sufficient pressure to spray or sprinkle at least the major part of the area between the two rows 11 and 12 of trees. As is conventional practice, when the irrigation of the area between the rows 11 and 12 has been completed, the irrigation tubing of the invention may be moved to the space between the next pair of rows, e. g. the space between the rows 12 and 13.

Referring now to Figs. 2 and 3 of the drawing, the irrigation tubing 10 of the invention includes at least two tubes 15 and 16 of a flexible material, such as rubber or one of the synthetic resins or plastics. The two tubes 15 and 16 are disposed side by side and are secured together, as by cementing or bonding at 17 along a zone between the two tubes. The tube 15 is provided with axially spaced pairs of holes or orifices 19 and the tube 16 is similarly provided with axially spaced pairs of holes or orifices 20, the pairs of orifices 19 being staggered with respect to the pairs of orifices 20. The orifices 19 and 20 are preferably disposed above a plane 21—21 containing the axes of the tubes 15 and 16 and are inclined upwardly so as to spray the water upwardly. One hole of each pair 20 is inclined upwardly and outwardly in one direction and the other is inclined upwardly and outwardly in the opposite direction. Thus, one of the holes 20 of each pair sprays water upwardly and outwardly in a direction away from the tube 15, whereas the other hole or orifice of such pair sprays water upwardly and outwardly across the tube 15. The holes 19 of each pair in the tube 15 are similarly located so that one hole 19 in each pair sprays water upwardly and outwardly away from the tube 16 and the other hole or orifice of such pair sprays water upwardly and outwardly across the tube 16. This spray distribution is illustrated best in Fig. 1 of the drawing and, as will be apparent, provides a very uniform distribution of the water throughout the area served by the irrigation tubing 10.

Although the tubes 15 and 16 have been shown in Figs. 2 and 3 as formed separately and as cemented or bonded or otherwise secured together at 17, it will be understood that the two tubes may be formed integrally. Referring to Fig. 4, which illustrates an irrigation tubing 30 of the invention, the tubes 15 and 16 are shown as formed integrally and as interconnected by a web 31.

Considering the operation of the invention, the necessary length of the irrigation tubing 10, or the irrigation tubing 30, of the invention is strung out between the rows 11 and 12. As will be apparent, the double tube arrangement of the invention causes the irrigation tubing to lie flat with the plane 21—21 thereof substantially parallel to the surface of the ground on which the tubing rests. Thus, by turning the irrigation tubing so that the orifices 19 and 20 are uppermost, it is a very simple matter to obtain proper orientation of the orifices so as to insure the spraying or sprinkling pattern desired, which is an important advantage of the invention. After the irrigation tubing has been positioned in this manner, the water is turned on and allowed to run for the length of time necessary to attain the desired moisture penetration. Thereafter, the irrigation tubing of the invention may be moved to the space between the next rows 12 and 13. This operation is greatly facilitated by the flexible nature of the irrigation tubing, it being possible to maneuver the tubing between the trees of the row 12 readily in moving to the space between the rows 12 and 13, which is an important advantage of the invention. For example, the irrigation tubing of the invention may be coiled to facilitate moving it, or it may merely be dragged from the space between the rows 11 and 12 into the space between the rows 12 and 13 between two of the trees in the row 12. After the transfer to the space between the rows 12 and 13 has been effected, the irrigation tubing of the invention is again strung out and turned or twisted until it lies flat with the orifices 19 and 20 uppermost as discussed above. Thereafter, the water is again turned on and the space between the rows 12 and 13 is irrigated, this process being repeated until the entire grove has been covered.

Preferably, flexible synthetic resins are employed for the irrigation tubing of the invention since it is possible, with such materials, to obtain the necessary strength for a given water pressure with a relatively small weight of material, thereby facilitating handling of the tubing and transferring it from the space between one pair of rows to the adjoining space, which is an important feature. Also, by employing a flexible material, handling and transfer of the irrigation tubing of the invention are greatly facilitated.

Another important advantage of employing a flexible material is that such a material tends to expand somewhat under pressure, thereby enlarging the orifices 19 and 20. In the event that sediment carried by the irrigation water plugs some or all of the orifices 19 and 20 in the tubes 15 and 16, the resulting pressure rise causes the tubes 15 and 16 to expand somewhat so as to enlarge the orifices 19 and 20 with the result that any sediment particles plugging such orifices are dislodged. Thus, the employment of a flexible material which is somewhat expansible results in an essentially nonclogging irrigation tubing, which is another important feature.

The holes or orifices 19 and 20 of the tubes 15 and 16 are preferably relatively small and may, for example, be made by means of a needle, not shown. When water under pressure is delivered to the tubes 15 and 16, the orifices 19 and 20 enlarge sufficiently to discharge substantial streams of water, depending upon the magnitude of the applied pressure. When the pressure is cut off, the material contracts to at least partially close the relatively small orifices 19 and 20, thereby tending to prevent the infiltration of dirt and the like into the tubes 15 and 16 when the tubing is dragged over the ground, for example, which is another important feature.

Another feature of the invention is that the use of two tubes approximately doubles the length of the strip which can be irrigated with a single tube of the same size, assuming the same pressure conditions, etc. In other words, using two tubes with staggered orifices spaced twice as far apart, as compared to the orifices in a single tube, the same uniform water distribution pattern is obtained over a strip approximately twice as long. Similar results may be obtained by adding a third tube.

Although I have disclosed exemplary embodiments of the invention and have discussed an exemplary application thereof, it will be understood that the invention is susceptible of other applications and that various changes, modifications and substitutions may be incorporated in the embodiments disclosed without departing from the spirit of the invention.

I claim as my invention:

1. A fluid distributing tubing including at least two tubes disposed side by side at least substantially in contact and secured together throughout their entire lengths, each of said tubes being provided with orifices therein through which fluid may flow from the interior of said tube.

2. A fluid distributing tubing including at least two tubes of flexible material disposed side by side at least substantially in contact and secured together throughout their entire lengths, each of said tubes having upwardly extending orifices through which fluid may flow from the interior thereof.

3. A fluid distributing tubing including at least two tubes of flexible material disposed side by side and secured together, each of said tubes being provided with axially spaced pairs of orifices therein above a plane defined by the axes of said tubes, one orifice of each pair in each of said tubes being inclined upwardly and outwardly in one direction and the other being inclined upwardly and outwardly in the opposite direction.

4. A fluid distributing tubing including at least two tubes of flexible material disposed side by side and secured together, each of said tubes being provided with axially spaced pairs of orifices therein above a plane defined by the axes of said tubes, one orifice of each pair in each of said tubes being inclined upwardly and outwardly in one direction and the other being inclined upwardly and outwardly in the opposite direction, said pairs of orifices in one of said tubes being staggered with respect to said pairs of orifices in the other.

5. A fluid distributing tubing as defined in claim 2 wherein said tubes are formed separately and bonded together.

6. A fluid distributing tubing as defined in claim 2 wherein said tubes are formed integrally.

7. A fluid distributing tubing as defined in claim 4 wherein said tubes are secured together throughout their entire lengths.

WILLIAM SEDAR.

REFERENCES CITED

The following references are of record in the file of this patent:

UNITED STATES PATENTS

| Number | Name | Date |
|---|---|---|
| 648,263 | Hull | Apr. 24, 1910 |
| 2,092,674 | Kennedy | Sept. 7, 1937 |

Disclaimer 2,621,075.—*William Sedar*, Santa Barbara, Calif. MULTIPLE IRRIGATION TUBING. Patent dated Dec. 9, 1952. Disclaimer filed Feb. 25, 1957, by the assignee, *The Borden Company*.

Hereby enters this disclaimer to claim 1 of said patent.

[*Official Gazette March 26, 1957.*]